United States Patent
Hsieh

(10) Patent No.: US 8,047,854 B2
(45) Date of Patent: Nov. 1, 2011

(54) DETACHABLE ELEMENT POSITIONING STRUCTURE

(75) Inventor: Sheng-Ming Hsieh, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 12/697,298

(22) Filed: Feb. 1, 2010

(65) Prior Publication Data

US 2011/0092090 A1 Apr. 21, 2011

(30) Foreign Application Priority Data

Oct. 21, 2009 (TW) ................................ 98135627 A
Dec. 11, 2009 (TW) ................................ 98142515 A

(51) Int. Cl.
*H01R 12/00* (2006.01)

(52) U.S. Cl. ......................................... 439/64; 439/357

(58) Field of Classification Search .................... 439/64, 439/377, 630, 357
See application file for complete search history.

(56) References Cited

U.S. PATENT DOCUMENTS

| | | | | |
|---|---|---|---|---|
| 6,402,529 | B2 * | 6/2002 | Saito et al. ...................... | 439/74 |
| 6,764,323 | B2 * | 7/2004 | Shimada et al. ............... | 439/138 |
| 2005/0260866 | A1 * | 11/2005 | Kojima ........................... | 439/64 |
| 2008/0050937 | A1 * | 2/2008 | Miyao et al. .................... | 439/64 |
| 2009/0298321 | A1 * | 12/2009 | Sakiyama et al. ............. | 439/377 |

* cited by examiner

*Primary Examiner* — Hien Vu
(74) *Attorney, Agent, or Firm* — CKC & Partners Co., Ltd.

(57) ABSTRACT

A detachable element positioning structure disposed at a side of a slot for positioning a detachable element in the slot is disclosed. The detachable element positioning structure includes a first elastic arm and a second elastic arm connected to the slot. The first elastic arm touches a top surface of the detachable element. The second elastic arm connects to the slot and has a protrusion. The detachable element has a side notch, and the protrusion is coupled to the side notch.

10 Claims, 3 Drawing Sheets

DETACHABLE ELEMENT POSITIONING STRUCTURE

RELATED APPLICATIONS

This application claims priorities to Taiwan Application Serial Number 98135627, filed Oct. 21, 2009 and Taiwan Application Serial Number 98142515, filed Dec. 11, 2009, which are herein incorporated by references.

BACKGROUND

1. Field of Invention

The present invention relates to a positioning structure. More particularly, the present invention relates to a detachable element positioning structure.

2. Description of Related Art

The memory is an important component on the computer. The processing data in the computers have highly increased with the rapid development of the computer processors, so the requirement of the memory has been getting higher and higher.

The memory is inserted in the memory slot to communicate to the main board of the computer. The memory has a through hole disposed on the flange of the memory, and the hook disposed at a side of the memory slot would hook the through hole to position the memory in the memory slot firmly. However, memory capacity of the memory has become larger and larger, and the space of the flange of the large capacity memory, such as DDR3 DRAM, is not enough to arrange the through hole.

Therefore, there is a need to provide a detachable element position structure.

SUMMARY

An embodiment of the invention provides a detachable element positioning structure disposed at a side of a slot for positioning a detachable element in the slot. The detachable element positioning structure includes a first elastic arm and a second elastic arm connected to the slot. The first elastic arm touches a top surface of the detachable element. The second elastic arm connects to the slot and has a protrusion. The detachable element has a side notch, and the protrusion is coupled to the side notch.

The second elastic arm is coupled to the side notch laterally. The detachable element has a flange, and the side notch is disposed at the flange. The first elastic arm touches the top surface of the flange. The second elastic arm can optionally have a hole disposed on the protrusion for coupling to the flange. The hole is arranged corresponding to a corner of the side notch. The second elastic arm can optionally have a hook disposed opposite to the protrusion; the side notch can be a curved notch. The material of the first elastic arm and the second elastic arm can be metal or plastic.

The pair of detachable element positioning structures is disposed at opposite sides of the slot to position the detachable element in the slot. The through hole in the conventional detachable element is instead of the side notch formed on the flange of the detachable element in this invention, thereby the protrusion of the second elastic arm of the detachable element positioning structure is coupled to the side notch of the detachable element to position the detachable element in the slot. The protrusion has the hole to couple to the flange of the detachable element, so that the detachable element can be secure in the slot firmly.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1A:
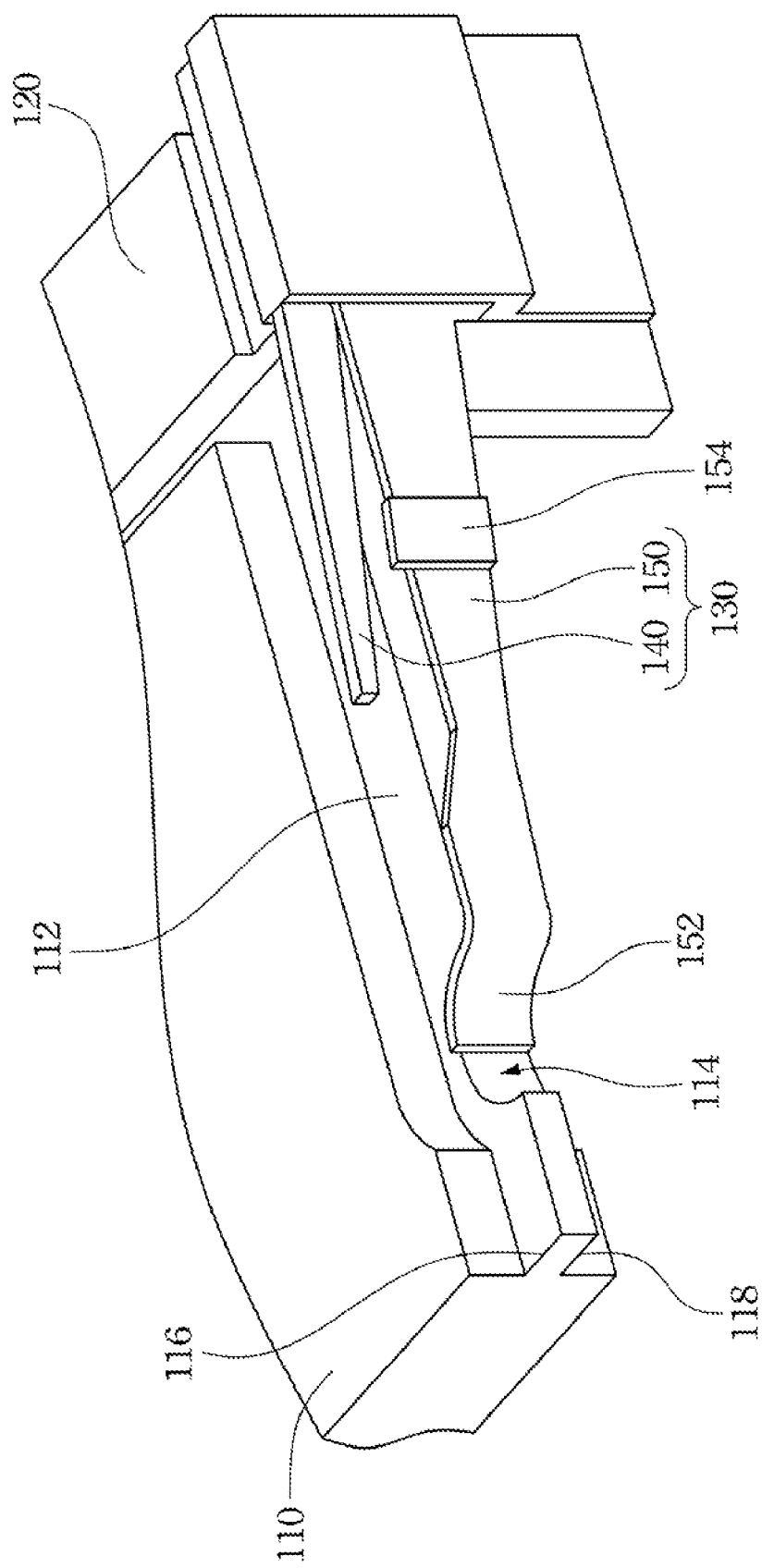
FIG. 1A is a local oblique diagram of a first embodiment of the detachable element positioning structure of the invention.

Reference will now be made in detail to the present embodiments of the invention, examples of which are illustrated in the accompanying drawings. Wherever possible, the same reference numbers are used in the drawings and the description to refer to the same or like parts.

The memory mentioned in the invention is the memory directly accessible to the CPU of the computer. The CPU continuously reads instructions stored there and executes them as required. The memory can be a dynamic random access memory (DRAM), such as a synchronized dynamic random access memory (SDRAM). The memory can be a single data rate SDRAM (SDR SDRAM) or a double data rate SDRAM (DDR SDRAM).

Figure 1B:
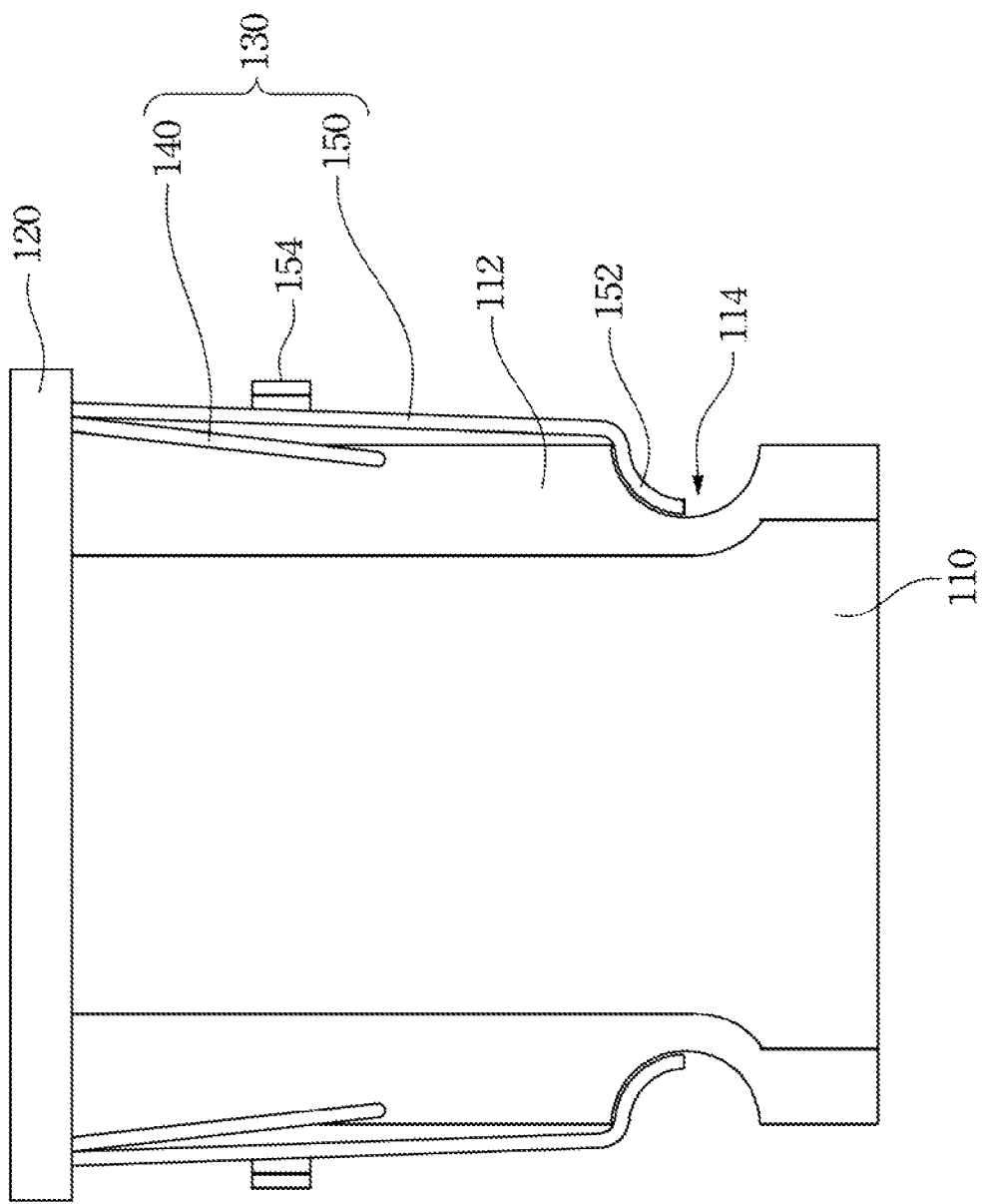
FIG. 1B is a local top view diagram of the detachable element positioning structure of the invention.

Refer to FIG. 1A and FIG. 1B simultaneously. FIG. 1A is a local oblique diagram of a first embodiment of the detachable element positioning structure of the invention. FIG. 1B is a local top view diagram of the detachable element positioning structure of the invention. The detachable element 110 is inserted in a slot 120. A pair of detachable element positioning structures 130 is disposed at opposite sides of the slot 120. For better description, only a side of detachable element positioning structure 130 is illustrated in FIG. 1A and FIG. 1B. The detachable element positioning structure 130 is used to position the detachable element 110 in the slot 120 firmly for prevent the detachable element 110 departing from the slot 120. The detachable element 110 can be the memory or other detachable element, such as a SD card, a wireless network card, a flash memory, or a mini-card.

The detachable element 110 has a flange 112. The detachable element 110 has a side notch 114 disposed on the flange 112. The side notch 114 has an open end. The side notch 114 of the invention is different from a through hole, which is regarded as a closed cavity, wherein the side notch 114 is disposed at an edge of the flange 112 and regarded as an open cavity. The detachable element 110 has a top surface 116 and a bottom surface 118, wherein the top surface 116 is the surface opposite to the main board, and the bottom surface 118 is the surface close to the main board.

The detachable element positioning structure 130 has a first elastic arm 140 and a second elastic arm 150 disposed neighbor to the first elastic arm 140. An end of the first elastic arm 140 and the second elastic arm 150 is connected to the slot 120. Namely the first elastic arm 140 and the second elastic arm 150 can be regarded as extended from the slot 120.

The material of the first elastic arm 140 and the second elastic arm 150 can be metal or plastic.

The first elastic arm 140 would touch and press the top surface 116 of the flange 112 of the detachable element 110 to restrict the vertical displacement of the detachable element 110. The second elastic arm 150 has a protrusion 152 arranged corresponding to the side notch 114. The protrusion 152 of the second elastic arm 150 couples to the side notch 114 laterally when the detachable element 110 is inserted in the slot 120 properly to restrict the horizontal displacement of the detachable element 110.

The protrusion 152 of the second elastic arm 150 would only couple to the side notch 114 of the detachable element 110 when the detachable element 110 is inserted in the slot 120 properly, so that the improper insertion of the detachable element 110 can be prevented. The shape of the protrusion 152 is designed to match the shape of the side notch 114. The side notch 114 is a curved notch, and the protrusion 152 thereof is a curved protrusion in this embodiment. In other embodiments, the shape of the protrusion 152 and the side notch 114 can be rectangle, triangle, or other shapes.

The second elastic arm 150 further includes a hook 154. The hook 154 is disposed at a side of the second elastic arm 150 opposite to the protrusion 152 and the detachable element 110. Users can pull the hook 154 to release the protrusion 152 from the side notch 114, and the protrusion 152 would not couple to the side notch 114, thereby the detachable element 110 can be pulled out from the slot 120.

Figure 2:
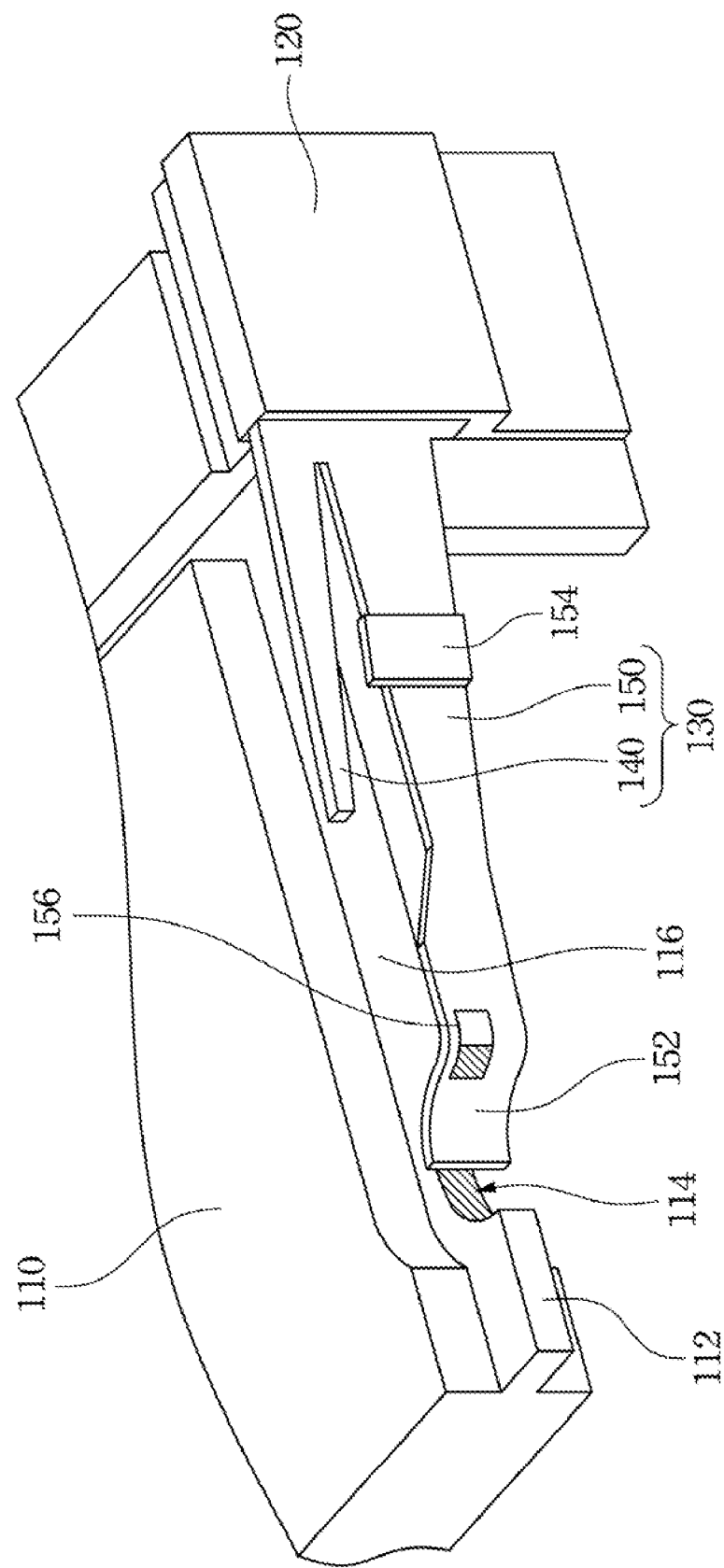
FIG. 2 is a side view diagram of a second embodiment of the detachable element positioning structure of the invention.

Refer to FIG. 2. FIG. 2 is a side view diagram of a second embodiment of the detachable element positioning structure of the invention. The detachable element positioning structure 130 includes the first elastic arm 140 and the second elastic arm 150 extended from a side of the slot 120. The first elastic arm 140 touches the top surface of the detachable element 110 to provide a pressing force to the detachable element 110 and restrict the vertical displacement of the detachable element 110.

The protrusion 152 of the second elastic arm 150 is coupled to the side notch 114 of the flange 112 of the detachable element 110 to restrict the horizontal displacement of the detachable element 110. The second elastic arm 150 has a hole 156 disposed on the protrusion 154. The hole 156 is arranged corresponding to the corner (edge) of the side notch 114. The height of the hole 156 is as same as the thickness of flange 112 of the detachable element 110. The hole 156 is coupled to the flange 112 of the detachable element 110 to further restrict the displacement of the detachable element 110.

The pair of detachable element positioning structures is disposed at opposite sides of the slot to position the detachable element in the slot. The through hole in the conventional detachable element is instead of the side notch formed on the flange of the detachable element in this invention, thereby the protrusion of the second elastic arm of the detachable element positioning structure is coupled to the side notch of the detachable element to position the detachable element in the slot. The protrusion has the hole to couple to the flange of the detachable element, so that the detachable element can be secure in the slot firmly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A detachable element positioning structure disposed at a side of a slot for positioning a detachable element in the slot, the detachable element positioning structure comprising:
   a first elastic arm connected to the slot, wherein the detachable element has a flange, and the first elastic arm touches a top surface of the flange of the detachable element; and
   a second elastic arm connected to the slot and comprising a protrusion, wherein the flange has a side notch, and the protrusion is coupled to the side notch;
   wherein the second elastic arm is coupled to the side notch laterally.

2. The detachable element positioning structure of claim 1, wherein the second elastic arm has a hole disposed on the protrusion for coupling to the flange.

3. The detachable element positioning structure of claim 2, wherein the hole is arranged corresponding to a corner of the side notch.

4. The detachable element positioning structure of claim 1, wherein the second elastic arm has a hook disposed facing away from the detachable element.

5. The detachable element positioning structure of claim 1, wherein the side notch is a curved notch.

6. The detachable element positioning structure of claim 1, wherein a material of the first elastic arm and the second elastic arm is metal.

7. The detachable element positioning structure of claim 1, wherein a material of the first elastic arm and the second elastic arm is plastic.

8. The detachable element positioning structure of claim 1, wherein the detachable element is a memory, a wireless network card, a flash memory, or a mini-card.

9. A detachable element positioning structure for positioning a detachable element is a slot, the detachable element positioning structure comprising:
   two first elastic arms disposed on opposite sides of the detachable element and connected to the slot, wherein the detachable element has flanges, and the first elastic arms touch a top surface of the flange of the detachable element; and
   two second elastic arms disposed laterally on opposite sides of the detachable element and connected to the slot, each of the second elastic arms comprising a protrusion, wherein the flanges has two side notches, and the protrusions are coupled to the side notches.

10. A method for positioning a detachable element in a slot by a detachable element positioning structure, which disposed at a side of the slot, the method comprising:
    inserting the detachable element in the slot,
    touching and pressing a top surface of a flange on a side of the detachable element by a first elastic arm of the detachable element positioning structure to restrict a vertical displacement of the detachable element; and
    coupling laterally a second elastic arm of the detachable element positioning structure to a side notch of the flange to restrict a horizontal displacement of the detachable element and fully insert the detachable element into the slot.

* * * * *